United States Patent [19]

Childress et al.

[11] Patent Number: 4,893,874
[45] Date of Patent: Jan. 16, 1990

[54] FREE FALLING LATCH PLATE ASSEMBLY

[75] Inventors: Keith D. Childress, Richmond; Thomas J. Corbett, Sterling Heights; Michele A. Smith, Davisburg, all of Mich.

[73] Assignee: Saturn Corporation, Troy, Mich.

[21] Appl. No.: 253,528

[22] Filed: Oct. 5, 1988

Related U.S. Application Data

[63] Continuation-in-part of Ser. No. 74,199, Jul. 16, 1987.

[51] Int. Cl.⁴ .............................................. A62B 35/00
[52] U.S. Cl. ..................................... 297/483; 24/196
[58] Field of Search ....................... 297/483, 476, 468; 24/196

[56] References Cited

U.S. PATENT DOCUMENTS

| | | | |
|---|---|---|---|
| 3,941,419 | 3/1976 | Blom | 297/483 |
| 3,974,546 | 8/1976 | Walker | 297/483 |

*Primary Examiner*—Francis K. Zugel
*Attorney, Agent, or Firm*—Charles E. Leahy

[57] ABSTRACT

According to the invention an improved latch plate assembly for a continuous loop single retractor seat belt system includes a housing having a base wall with flanges slotted to slidably mount a lock bar. The housing is oriented with the flanges facing toward the occupant torso and the belt being routed through the space between the base wall and the sliding bar so that when the belt is stored in the generally vertically extending position between the upper and lower anchors, the belt extends in a minimally convoluted path through the latch plate thereby permitting gravity induced sliding movement of the latch plate along the belt toward the lower end of the belt. The housing is further characterized by an abutment structure adapted upon migration of the lock bar along the slot with the occurrence of generally colinear orientation of the lap and shoulder belts upon buckling of the belt to introduce a substantially convoluted path of belt through the latch plate and trap the belt between the sliding bar and the flange structure so that the travel of the belt through the latch plate is effectively prevented at least in the direction which would extend the length of the lap belt portion.

8 Claims, 4 Drawing Sheets

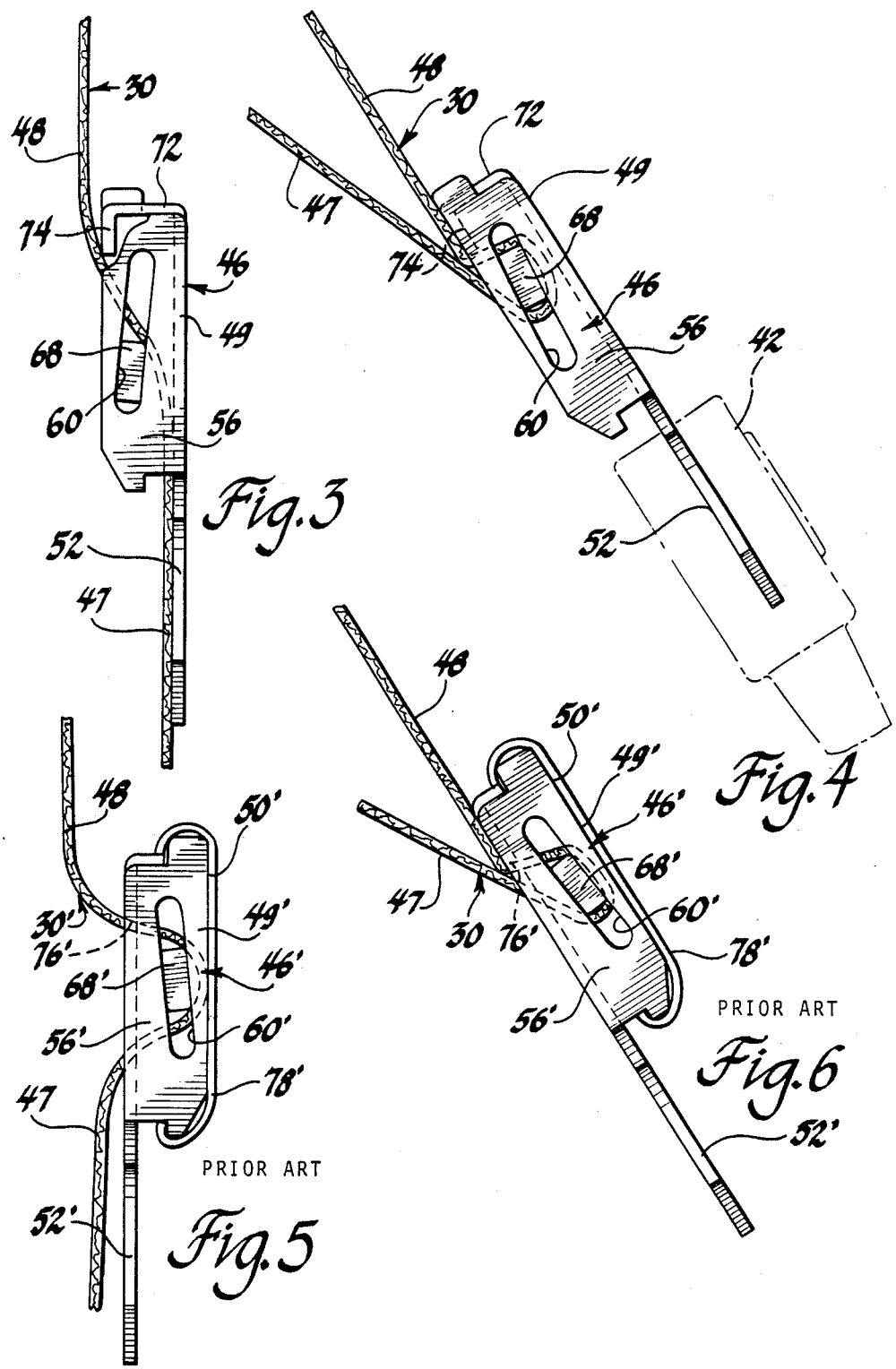

FREE FALLING LATCH PLATE ASSEMBLY

This is a continuation-in-part of Ser. No. 074,199 filed July 16, 1987.

This invention relates to a latch plate assembly dividing a continuous loop restraint belt into lap and shoulder belt portions and more particularly provides a latch plate assembly which is effective when the belt is buckled about the occupant to permit belt transference only in the direction of tightening the lap belt and is effective when the belt is stored in a generally vertical orientation to permit the latch plate assembly to fall freely along the belt to the seat.

BACKGROUND OF THE INVENTION

It is known in vehicle seat belt systems to employ a continuous loop of belt having a latch plate assembly slidable therealong to adjust the relative restraint lengths of the lap and shoulder belt portions. It is also known to provide a retractor mounting one end of the belt, preferably the shoulder belt end, to wind the continuous loop belt to a stored position extending generally vertically between an upper anchor mounting the shoulder belt end on the vehicle body and a lower anchor mounting the lap belt end on the vehicle body. The belt may be unwound from the retractor and extended across the occupant torso to engage the latch plate assembly in a buckle suitably mounted on a vehicle body inboard the occupant seat.

The latch plate assembly most commonly used in conjunction with the aforedescribed continuous loop single retractor seat belt system is comprised of a housing having a stamping with a base wall and upturned flanges at the sides of the base wall. Angled slots provided in the upturned flanges slidably mount a lock bar. A rectangular aperture provided in the base wall permits the continuous loop belt to enter the housing, wrap around the bar, and then exit back through the rectangular opening. This latch plate assembly is oriented with the base wall adjacent the occupant torso and the flanges directed away from the occupant torso When the latch plate assembly is engaged in the buckle, the lap belt and shoulder belt portions are oriented generally colinear with one another and the tension on the lap belt induces the lock bar to slide to the end of the slot furthest from the buckle, the belt is cinched so that the transference of the belt through the latch belt assembly is limited to the direction in which the lap belt length is shortened. When the buckle is unbuckled, the retractor winds the continuous loop belt to a generally vertical condition, running generally between the upper and lower anchors. A convoluted pathway of the belt through the rectangular opening in the base wall and thence around the lock bar effectively prevents the latch plate assembly from sliding on the belt unless the occupant grips the belt and pulls the belt through the latch plate assembly.

It would be desirable to provide a latch plate assembly in which the latch plate would be free falling relative to the belt when in a stored position so that the force of gravity would induce the latch plate assembly to slide vertically down along the stored belt to a position on the seat or adjacent the lower anchor where it can be predictably gripped by the occupant during a subsequent attempt to don the seat belt.

SUMMARY OF THE INVENTION

According to the invention an improved latch plate assembly for a continuous loop single retractor seat belt system includes a housing having a base wall with flanges slotted to slidably mount a lock bar. The housing is oriented with the base wall facing away from the occupant torso and the flanges facing toward the occupant torso and the belt being routed through the space between the base wall and the lock bar so that when the belt is stored in the generally vertically extending position between the upper and lower anchors, the belt extends in a minimally convoluted path through the latch plate thereby permitting gravity induced sliding movement of the latch plate along the belt toward the lower end of the belt. The housing is further characterized by an abutment structure adapted upon migration of the sliding bar along the slot with the occurrence of generally colinear orientation of the lap and shoulder belts upon buckling of the belt to introduce a substantially convoluted path of belt through the latch plate and trap the belt between the sliding bar and the abutment structure so that the travel of the belt through the latch plate is effectively prevented at least in the direction which would extend the length of the lap belt portion.

BRIEF DESCRIPTION OF THE DRAWINGS

These and other objects, features and advantages of the invention will become apparent upon consideration of the description of the preferred embodiment in the appended drawings in which:

FIG. 3 is an enlarged fragmentary view of FIG. 1 showing the latch plate assembly in the stored position free falling along the belt;

FIG. 4 is a side elevational view of the latch plate assembly showing the buckled position of FIG. 1 in which the continuous loop belt is cinched to permit transference through the latch plate in a direction to tighten the lap belt;

FIG. 5 is a view similar to FIG. 3 but showing the prior art latch plate frictionally gripped upon the belt against free falling movement therealong;

FIG. 6 is a view of the prior art latch plate of FIG. 5 but showing in the buckled position corresponding to FIG. 4 and showing the continuous loop belt cinched to permit transference of belt in the direction to tighten the belt lap.

DESCRIPTION OF THE PREFERRED EMBODIMENT

Figure 1:
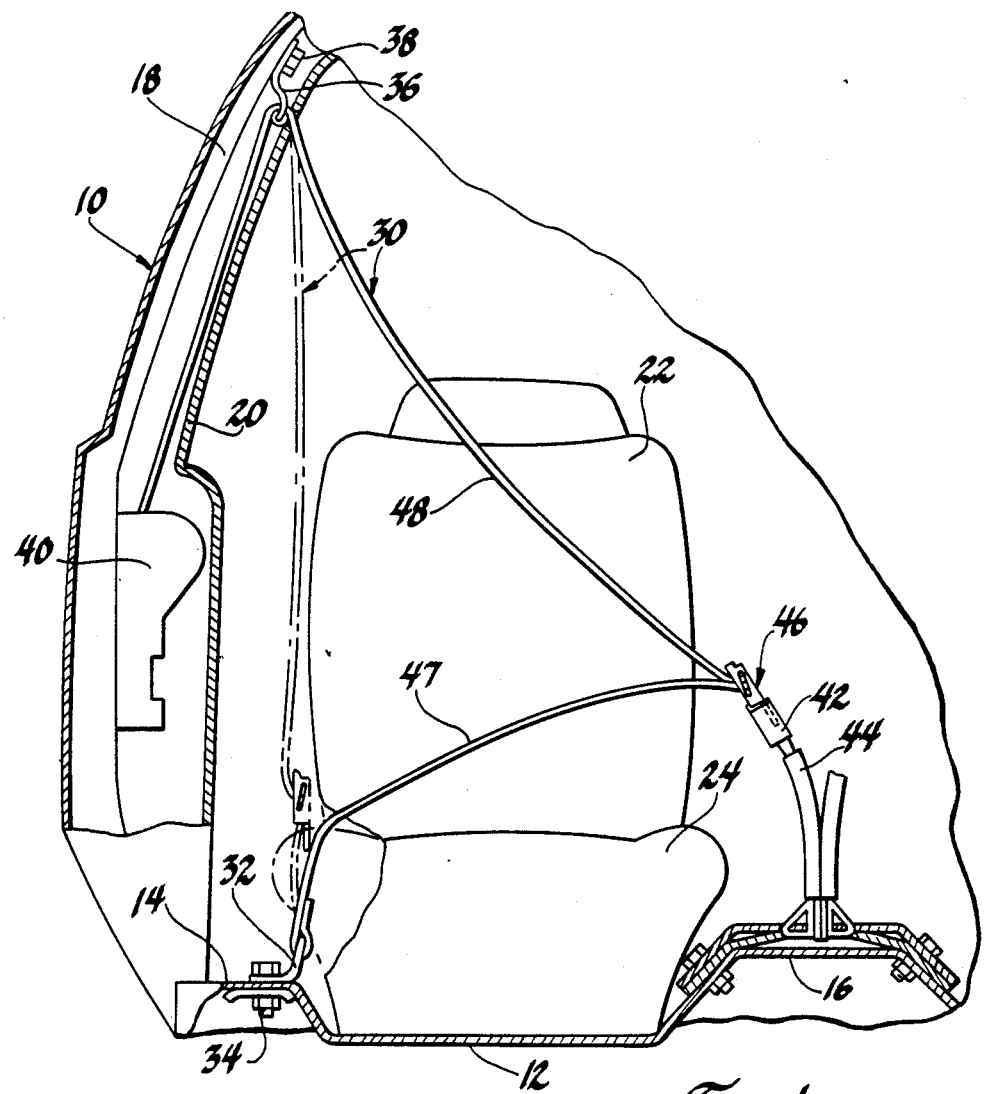
FIG. 1 is a sectional view taken through a vehicle body having an occupant restraint belt system including the latch plate assembly of this invention.

Referring to FIG. 1, a vehicle body indicated by the numeral 10 includes a floor 12 having an outboard sill 14 and an inboard transmission tunnel 16. A pillar 18 extends vertically adjacent the rear of the seat outboard thereof and includes a trim panel 20 facing the passenger compartment of the vehicle body.

An occupant seat mounted within the occupant compartment includes a seat back 22 and a seat bottom 24. An occupant restraint system includes a continuous loop restraint belt 30 having a lower end attached to the sill 14 by an anchor plate 32 and bolt assembly 34. The upper end of the continuous loop belt 30 passes through a guide loop 36 attached to the pillar 18 by a bolt 38 and extends downwardly to a shoulder belt retractor 40 which winds the continuous loop belt 30 to a phantom line indicated stored position extending generally vertically along the trim panel 20 between the anchor plate 32 and the guide loop 36.

A seat belt buckle 42 is mounted on the transmission tunnel 16 by a semi-rigid anchor strap 44. A latch plate assembly 46 is slidable along the continuous loop belt 30 and divides the continuous loop belt 30 into a lap belt portion 47 and a shoulder belt portion 48 when the latch plate assembly 46 is engaged within the buckle 42 as shown in FIG. 1.

Figure 2:
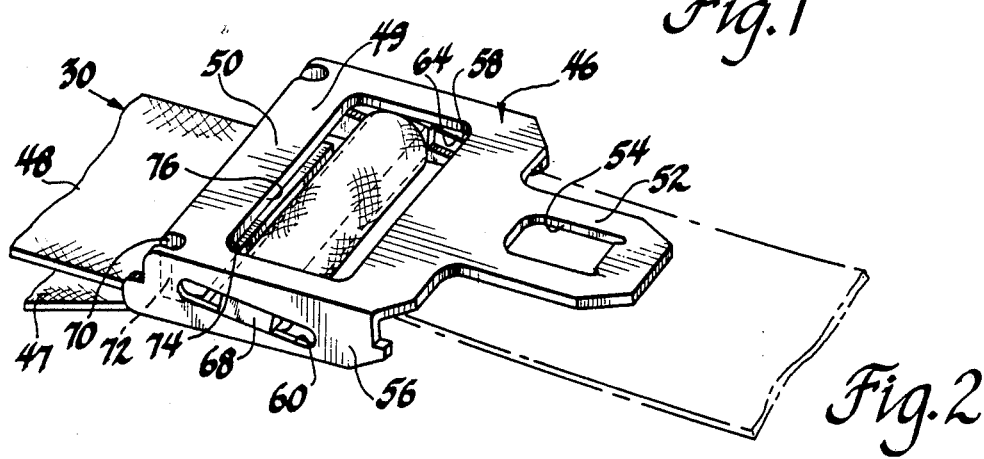
FIG. 2 is a perspective view of the latch plate assembly of this invention.

Referring to FIG. 2, it is seen that the latch plate assembly 46 is comprised of a housing 49 which is stamped from sheet steel and includes a generally planar base wall 50 having a latch tongue 52 which is necked down to extend into the buckle 42 and has an aperture 54 for receiving the latch of the buckle.

The housing 49 also includes downturned flanges 56 and 58 having longitudinal extending inclined slots 60 and 64 respectively provided therein. A lock bar 68, comprised of a rectangular bar of metal, has its end captured in the slots 60 and 64 to mount the lock bar for longitudinal sliding movement relative to the housing 49.

In addition, the housing 49 has a reversely bent abutment structure 70 at the end thereof opposite the tongue 52 including a wall 72 extending perpendicularly from the base wall 50 and an abutment wall 74 extending between the flanges 56 and 58 and toward the tongue 52 and in parallel spaced relation with the base wall 50.

As best seen by reference to FIGS. 1, 2 and 3, the belt is routed through the space between the base wall 50 and lock bar 68. Furthermore, as best shown in FIG. 4, the housing is oriented on the belt with the base wall 50 facing away from the seated occupant and the flanges 56 and 58 facing toward the occupant.

Referring to FIGS. 1 and 3, it is seen that when the latch plate assembly 46 is disengaged from the buckle 42, the continuous loop belt 30 is wound up by the retractor 40 to its stored condition in which it extends generally vertically between the anchor plate 32 and the slide loop 36. The routing of the continuous loop belt 30 through the latch plate assembly 46 is such that the belt 30 is substantially non-convoluted and the force of gravity acts to move the lock bar 68 downwardly along the slots 60 and 64 and to slide the latch plate assembly 46 vertically downwardly along the belt 30 to rest upon the seat bottom 24 as shown in phantom line in FIG. 1.

Referring to FIGS. 1 and 4, it is seen that when the latch plate assembly is buckled in the buckle 42, the tension on the belt 30, particularly the tension on the lap belt 47, acts in the upward direction to urge lock bar 68 upwardly along the slots 60 and 64. Because the belt has assumed a substantially convoluted path through the latch plate assembly 46, and additionally, because the movement of the lock bar 68 upwardly traps the shoulder belt portion 48 against the abutment wall 74 of reversely bent abutment structure 70, the belt 30 is substantially inhibited from transference through the latch plate assembly 46. An increased load on the lap belt 47 renders it all the more difficult to transfer belt from the shoulder belt to the lap belt. However, if the occupant wishes to tighten the lap belt 47, he need only pull lightly on the shoulder belt 48 to transfer belt through the latch plate in a direction to shorten the lap belt 47 and lengthen the shoulder belt 48 with the excess being taken up by the retractor 40.

FIGS. 5 and 6 show the prior art latch plate assembly referred to hereinbefore in the background of the invention. In particular in FIG. 5 it is seen that the latch plate assembly 46' includes some structural similarity with the latch plate assembly of the present invention and in particular, the latch plate assembly is seen to include a housing 49' having a base wall 50', tongue 52', flange 56' having slot 60', and lock bar 68'. In addition it is seen that the base wall 50' has a large rectangular opening 76' therein and that the continuous loop belt 30 passes through the large rectangular opening 76' around the lock bar 68' and back through the rectangular opening 76'. Furthermore, it is seen that the housing is oriented on the belt with the base wall 50' facing toward the occupant and the flange 56' facing away from the occupant.

As seen in FIG. 5, when the belt is stored in the generally vertical position, the belt 30 assumes a substantially convoluted path through the latch plate assembly 46' so that the latch plate assembly 46' does not fall freely on the belt 30 under the impetus of gravitational force, but rather the occupant must grip the belt and the latch plate assembly in order to effect sliding movement of the latch plate assembly along the belt. Referring to FIG. 6, it is seen that the buckled position of the latch plate assembly relative to the belt causes the belt to assume an even more convoluted path through the latch plate so that the belt is substantially impeded against movement through the latch plate, particularly in the direction which would increase the length of the lap belt portion. However, in contrast to the latch plate assembly of this invention, it is seen that the prior art latch plate assembly of FIG. 6 does not have an abutment structure such as the reversely bent abutment structure 70 to convolute and trap the belt.

As seen in FIGS. 5 and 6 the prior art latch plate assembly includes a cover 78' which spans between the flanges 56' and 58' to conceal the belt and the lock bar 68' from view. Referring again to FIGS. 2, 3 and 4, it will be appreciated that the latch plate assembly 46 of the present invention may have a cover which covers the face of the base wall 50 facing away from the seat occupant, but no cover can be employed spanning between the flanges 56 and 58 because the belt 30 traverses this open space.

Comparing FIGS. 3 and 4, it will be appreciated that the incline of the slots 60 and 64 and the sliding movement of the lock bar 68 therealong, contributes to the degree of convolution experienced by the belt as it passes through the latch plate assembly. In particular, in the FIG. 3 free falling position the lock bar 68 has traveled toward the forward or lower end of the slots to be positioned further away from the base wall 50 of the latch plate housing and to lessen the degree of convolution experienced by the belt. On the other hand, as seen in FIG. 4, the travel of the lock bar 68 in the upward direction along the slots 60 and 64 allows the lock bar 68 to be closer to the base wall 50 and farther away from the reversely bent flange 74 and thereby introduce a more angular and convoluted path into the belt.

Referring again to FIG. 2, it is seen that the latch plate assembly 46 of this invention also has a large rectangular opening 76 in the base wall 50. However, it is noted that this opening 76 serves no function beyond reducing the weight of the latch plate assembly.

DESCRIPTION OF AN ALTERNATIVE EMBODIMENT

FIGS. 7 through 10 show an alternate embodiment of the invention.

Figure 7:
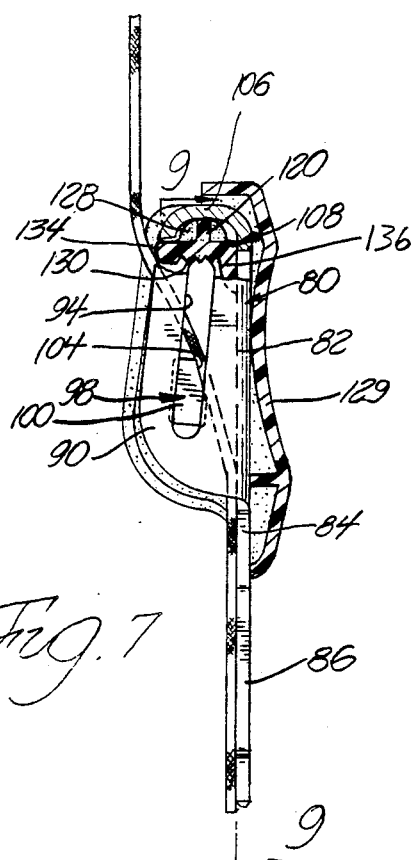
FIG. 7 is an enlarged fragmentary view of a second embodiment of the invention showing the latch plate assembly in the stored position free falling along the part.
Figure 9:
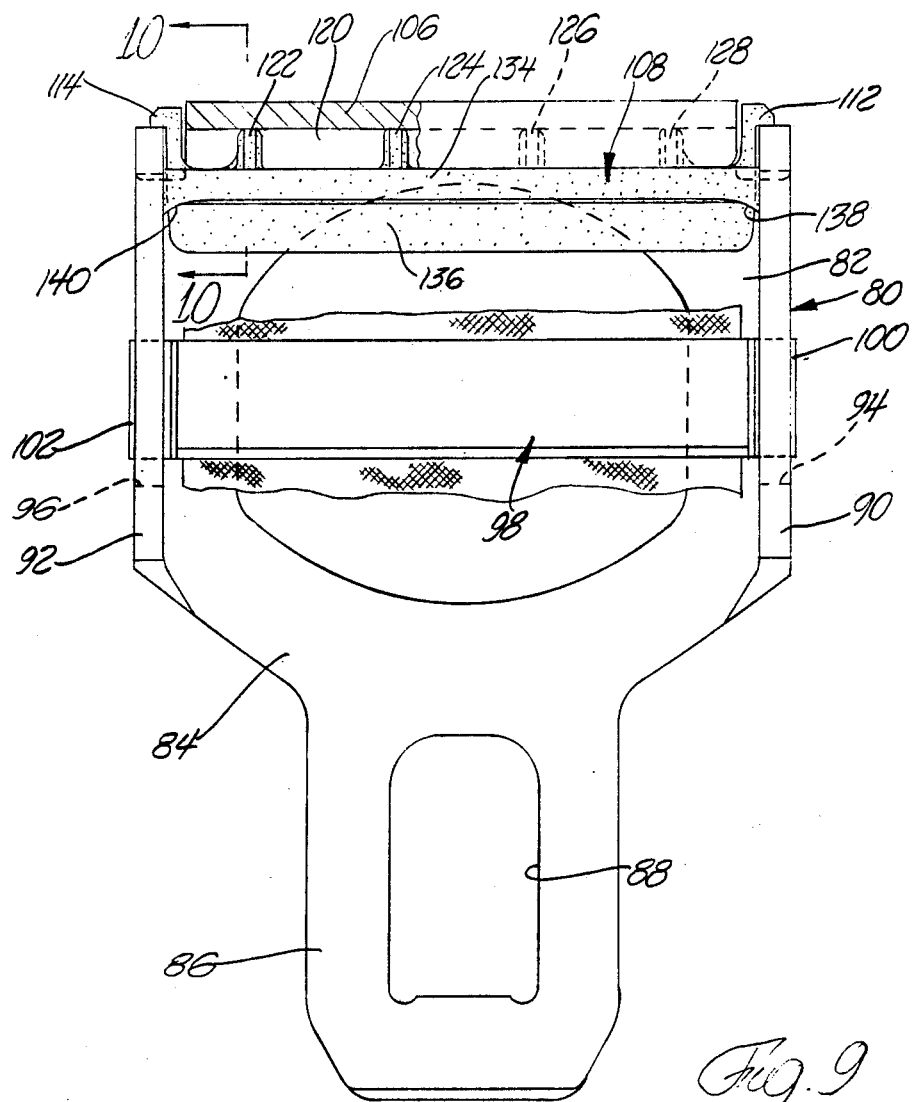
FIG. 9 is a plan view of the latch plate assembly taken in the direction of arrows 9—9 of FIG. 7.

Referring to FIGS. 7 and 9, it is seen that the latch plate assembly 80 is comprised of a housing 82 which is stamped from sheet steel and includes a generally planar base wall 84 having a latch tongue 86 which is necked own to extend into the buckle and has an aperture 88 for receiving the latch of the buckle.

The housing 82 also includes flanges 90 and 92 having longitudinal extending inclined slots 94 and 96 respectively provided therein. A lock bar 98 comprised of a rectangular bar of metal has its necked down ends 100 and 102 captured in the slots 94 and 96 to mount the lock bar for longitudinal sliding movement relative to the housing 82. Lock bar 98 has a chamfered face 104.

Figure 10:
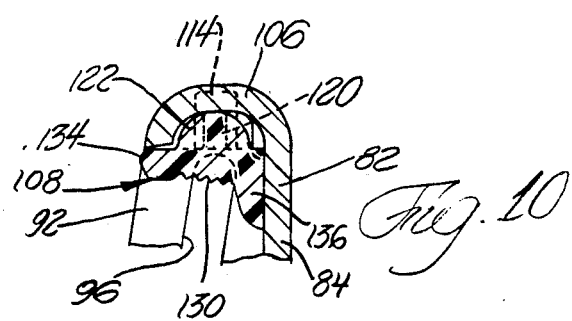
FIG. 10 is a sectional view taken in the direction of arrows 10—10 of FIG. 9.

In addition, the housing 82 has a reversely bent flange 106 at the end thereof opposite the tongue 6. The flange 106 is substantially C-shaped as, best seen in FIGS. 7 and 10. A molded plastic clamping abutment 108 is carried by the housing 82 and seated against the C-shaped flange 106. As best seen in FIGS. 9 and 10, the clamping abutment 108 extends the full width of the housing 82 between the flanges 90 and 2 and has integrally molded snap tabs 112 and 114 which seat between the flanges 90 and 92 and the C-shaped flange 106 to attach the clamping abutment 108 to the housing 82. The clamping abutment 108 has a continuous rib 120, as best seen in FIG. 7, which bears against the C-shaped flange 106. A plurality of semi-circular web portions 122, 124, 126 and 128 are spaced along the continuous web 120. As best seen in FIGS. 7 and 10, the plastic clamping abutment 108 has integrally molded teeth 130 which face toward the lock bar 98. The clamping abutment 108 also has an outer lip 134 and an angled foot 136 which are provided on opposite sides of the teeth 130. The ends of the clamping abutment 108 closest to the flanges 90 and 92 are rounded at 138 and 140.

Referring to FIG. 7, it is seen that when the latch plate assembly 80 is disengaged from the buckle, the continuous loop belt is wound up by the retractor to its stored condition in which the belt extends generally vertically. The routing of the continuous loop belt through the latch plate assembly is such that the belt is substantially non-convoluted and the force of gravity acts to move the lock bar 98 downwardly along the slots 94 and 96 and to slide the latch plate assembly 80 vertically downwardly along the belt. The chamfered face 104 of the lock bar allows the belt to take a substantially non-convoluted path through the latch plate and promotes sliding movement of the latch plate assembly along the belt. The belt also bears on the outer lip 134 to promote low friction sliding of the latch plate assembly on the belt.

Figure 8:
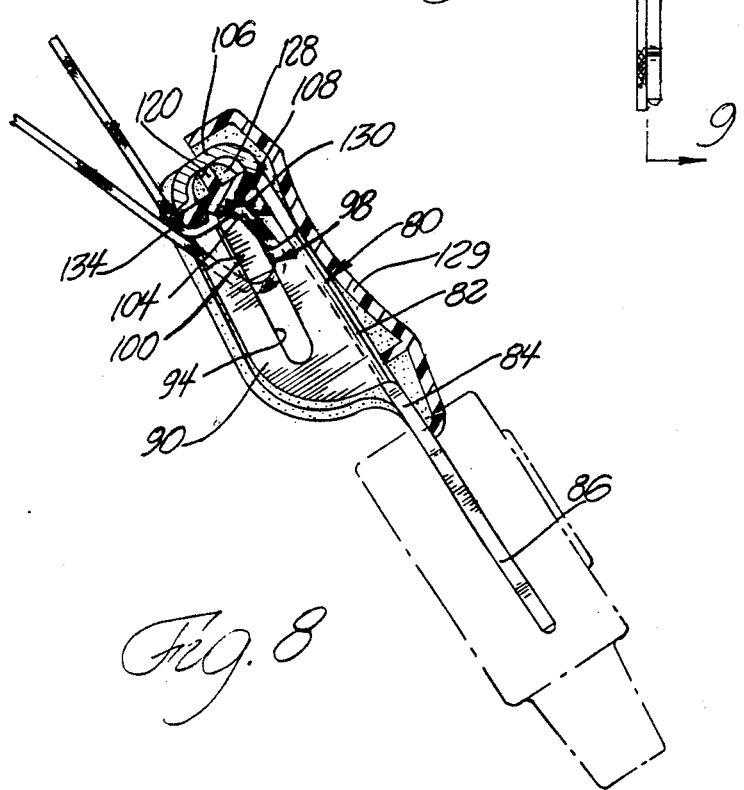
FIG. 8 is a side elevational view of the latch plate assembly showing the buckled position in which the continuous loop belt is cinched to permit transference through the latch plate in a direction to tighten the lap belt.

Referring to FIGS. 1 and 8, it is seen that when the latch plate assembly 80 is buckled in the buckle, the tension on the belt, particularly the tension on the lap belt, acts in the upward direction to urge the lock bar 98 upwardly along the slots 94 and 96. Because the belt has assumed a substantially convoluted path through the latch plate assembly 80, and additionally, because the movement of the lock bar 98 upwardly traps and clamps the shoulder belt against the plastic clamping abutment 108, the belt is substantially inhibited from transference through the latch plate assembly. In addition, the upward movement of the lock bar 98 carries the chamfered face 104 into proximity with the angled foot 136 of the clamping abutment 108. Accordingly, the belt may also be progressively clamped between the chamfered face 104 and the angled foot 136. A progressively increasing load on the belts renders it all the more difficult to transfer the belt from the shoulder belt to the lap belt, or vice versa.

A molded plastic cover 129 is provided to improve the appearance of the buckle and is snap fit onto the base wall 84 and the flanges 90 and 92.

It will be understood that the cinching of the belt by the latch plate assembly may be controlled by controlling any of the several variables involved in the dimensioning and construction of the buckle. For example, the extent of clamping of the belt between the lock bar and the teeth will be determined by the configuration of the teeth 130 and the shape of the lock bar and the length of the angled slots 94 and 96. In addition, the angular relation and spacing between the chamfered face 104 and the angled foot 136 will also affect the clamping of the belt. Furthermore, the extent to which the belt becomes convoluted and trapped within the latch plate assembly is determined by variables including the location of the outer lip 134 of the clamping member 108 and its location relative to the position of the lock bar 98.

In comparing the embodiment of FIGS. 1 through 4 with the embodiment of FIGS. 7 through 10, it is appreciated that the clamping abutment 108 provides the additional function of supporting the lock bar 98 along its entire length, whereas in the embodiments of FIGS. 1 through 4 the lock bar 98 was supported only at the ends thereof. By supporting the lock bar along the entire length thereof, the tendency of the lock bar to bend about its ends is minimized and this too affects the nature and extent of the cinching of the belt by the latch plate assembly. For example, as seen in FIG. 4, the first embodiment of the invention relies more upon the convoluted path of the belt through latch plate to cinch the belt, while in the second embodiment the cinching is provided by the combination of the convoluted path and the clamping of the belt against the clamping abutment.

Thus it is seen that the invention provides a new and improved latch plate assembly for a continuous loop belt system having the advantage of permitting free falling of the latch plate along the belt when the latch plate is disengaged from the buckle and cinching the continuous loop belt when the latch belt is engaged within the buckle.

Although the latch plate assembly is shown and described herein as applied to the front seat of a vehicle body, it is understood that the latch plate may be fully applicable to rear seat applications in those vehicles having a continuous loop three point restraint belt system.

Furthermore, it will be understood that the free falling latch plate assembly of this invention is especially suited for use in conjunction with an infant seat because the buckling of the latch plate assembly into the buckle orients the latch plate assembly to cinch the lap belt so that the latch plate will effectively restrain the infant seat on the vehicle seat.

The embodiments of the invention in which an exclusive property or privilege is claimed are defined as follows:

1. In a seat belt system with a continuous length of belt having an upper end mounted adjacent the occupant shoulder and a lower end mounted adjacent the occupant lap, a retractor associated with at least one end of the belt to pull the belt to a stored condition extending generally vertically between the upper and lower ends and permit extension of the belt across the torso of a seated occupant for buckling by a belt buckle mounted inboard of the seat, and a latch plate carried by the belt for engagement by the buckle and including a housing having a planar base wall with a tongue projecting from one end thereof for latching engagement by the buckle, a pair of flanges integral with the base wall and extending perpendicularly therefrom at a lateral spacing somewhat greater than the width of the belt, and a lock bar slidably mounted in slots provided in the flanges, the improvement comprising:

said housing being oriented with the flanges facing toward the occupant torso and the belt being routed through the space between the base wall and the sliding bar so that when the belt is stored extending generally vertically between the upper and lower anchors, the belt extends in a minimally convoluted path through the latch plate, thereby permitting gravity induced sliding movement of the latch plate along the belt toward the lower anchor;

and an abutment structure carried by the housing at the end thereof opposite the tongue and adapted upon the migration of the sliding lock bar along the slot with the occurrence of generally colinear overlying orientation of the lap and shoulder belts upon buckling of the belt to introduce a substantially convoluted path of the belt through the latch plate and trap the belt between the sliding lock bar and the abutment structure so that the belt is cinched and travel of the belt through the latch plate is effectively prevented at least in the direction which would extend the length of the lap belt portion.

2. The combination of claim 1 in which the slots provided in the flanges are angularly disposed with relation to the base wall so that the lock bar approaches progressively closer to the base wall as the lock bar slides along the slots toward the abutment structure to increase the degree of convolution experienced by the belt during cinching of the belt and the lock bar is located furthest from the base wall when the lock bar slides furthest form the abutment structure during storage of the belt in the vertical extending stored position to lessen the degree of convolution of the belt through the latch plate assembly and promote free falling of the latch plate along the belt.

3. The combination of claim 1 in which the lock bar has a chamfered face bearing against the belt to lessen the degree of convolution of the belt through the latch plate when the belt is stored in the vertically extending position to promote the free falling of the latch plate along the belt.

4. The combination of claim 1 further characterized by said abutment structure being a reversely bent flange integral with the housing and including a first wall portion extending perpendicular to the base wall and a second wall portion extending parallel to the base wall.

5. The combination of claim 1 further characterized by said abutment structure being a plastic clamping abutment carried by the housing.

6. The combination of claim 5 in which the lock bar travels along the slots and clamps the belt against the plastic clamping abutment and the clamping abutment supports the lock bar intermediate its mounting in the slots of the housing to support the lock bar against bending when an occupant restraint load is applied on the belt.

7. The combination of claim 5 in which the molded plastic clamping abutment has integrally molded teeth and the belt becomes clamped between the sliding lock bar and the teeth of the molded plastic clamping abutment.

8. The combination of claim 5 in which the molded plastic clamping abutment includes an integrally molded foot portion projecting therefrom and extending along the base wall of the housing and the lock bar has a chamfered face which approaches the foot portion of the molded plastic clamping abutment upon sliding movement of the lock bar toward the molded plastic clamping abutment to clamp the belt between the chamfered face and the foot portion.

* * * * *